R. B. CORBIN.
HOG-TRAPS.
No. 194,652. Patented Aug. 28, 1877.
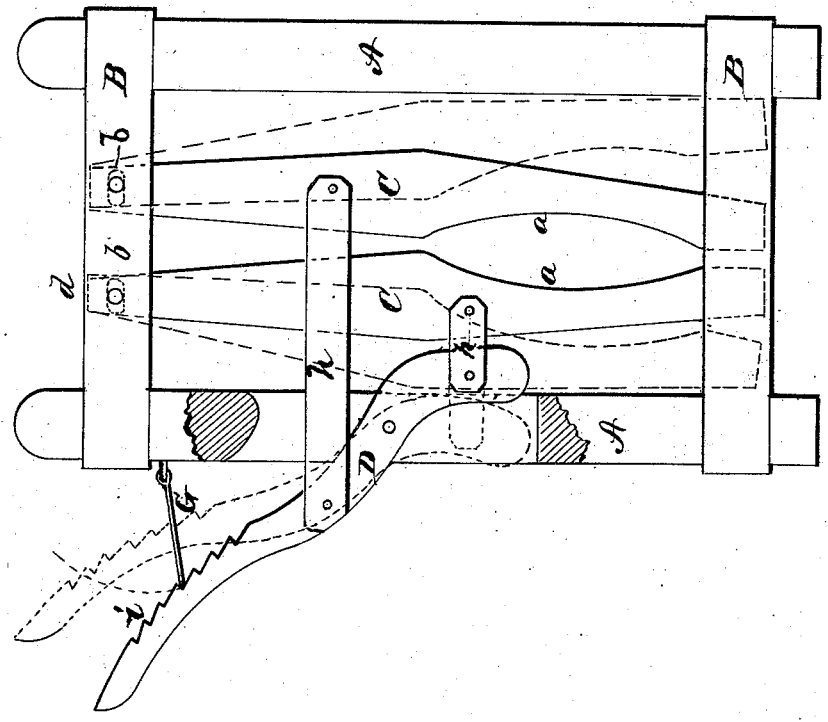
Witnesses:
F. L. Ouraud
Hank Galt
Inventor:
Richard B. Corbin
Alexander Mason
Attorneys:
N. PETERS, PHOTO-LITHOGRAPHER, WASHINGTON, D. C.

UNITED STATES PATENT OFFICE.

RICHARD B. CORBIN, OF YATES CITY, ILLINOIS.

IMPROVEMENT IN HOG-TRAPS.

Specification forming part of Letters Patent No. 194,652, dated August 28, 1877; application filed July 10, 1877.

*To all whom it may concern:*

Be it known that I, RICHARD B. CORBIN, of Yates City, in the county of Knox, and in the State of Illinois, have invented certain new and useful Improvements in Hog-Traps; and do hereby declare that the following is a full, clear, and exact description thereof, reference being had to the accompanying drawings, and to the letters of reference marked thereon, making a part of this specification.

The nature of my invention consists in the construction and arrangement of a device for firmly holding hogs or cattle for the purpose of ringing, altering, or branding, without injury to the animals, as will be hereinafter more fully set forth.

In order to enable others skilled in the art to which my invention appertains to make and use the same, I will now proceed to describe its construction and operation, referring to the annexed drawing, which represents a front elevation of my invention.

I first construct a frame of two upright side posts, A A, connected, near the top and bottom, by cross-bars B B on both sides.

Between the two top cross-bars B B are pivoted two jaws, C C, which extend downward, and their lower ends playing between the bottom cross-bars of the frame. The lower portions of these jaws are, on their inner edges, formed with curves $a\ a$, of suitable shape to fit the neck of the animal for which the trap is intended.

At the upper ends of the jaws are slots $b\ b$, through which the pivot-pins $d\ d$ pass to allow the upper ends of the jaws to separate a certain distance to allow larger animals to pass through. In a mortise made in one of the side posts A is pivoted a curved lever, D, which, by straps $h\ h$, is connected with the two jaws C C, said straps being attached to the lever above and below the fulcrum, as shown. The upper portion of the lever D is formed with ratchet-teeth $i$, into which falls a pawl or catch, G, to hold the jaws more or less closed, as desired.

This device is to be fastened to the end of a narrow shute, and the animals driven up to it, when they will attempt to run through, but can be held firmly by simply operating the lever. The size of the various parts of this machine depends entirely upon what kind of animals it is to be used for. It may be made of any size desired.

Having thus fully described my invention, what I claim as new, and desire to secure by Letters Patent, is—

The combination of the frame A B, jaws C C, provided with the curves $a\ a$, and slots $b\ b$, and pivoted at $d\ d$, the curved lever D, with ratchet-teeth $i$, the connecting-straps $h\ h$, and pawl or catch G, substantially as and for the purposes herein set forth.

In testimony that I claim the foregoing I have hereunto set my hand this 12th day of June, A. D. 1877.

RICHARD B. CORBIN.

Witnesses:
   W. H. ROBINSON,
   CHARLES L. ROBERTS.